United States Patent
Komiya et al.

(10) Patent No.: US 8,815,354 B2
(45) Date of Patent: Aug. 26, 2014

(54) HEAT- AND PRESSURE-RESISTANT POLYESTER BOTTLE AND PROCESS FOR PRODUCING THE SAME

(75) Inventors: Atsushi Komiya, Yokohama (JP); Yuki Satoh, Yokohama (JP); Koki Okabe, Yokohama (JP); Takahiro Ookubo, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 827 days.

(21) Appl. No.: 12/666,755

(22) PCT Filed: Jun. 26, 2007

(86) PCT No.: PCT/JP2007/063196
§ 371 (c)(1),
(2), (4) Date: Dec. 24, 2009

(87) PCT Pub. No.: WO2009/001475
PCT Pub. Date: Dec. 31, 2008

(65) Prior Publication Data
US 2010/0200531 A1    Aug. 12, 2010

(51) Int. Cl.
*B32B 1/02*   (2006.01)
*B32B 1/08*   (2006.01)

(52) U.S. Cl.
USPC ....... 428/35.7; 428/34.1; 428/34.2; 428/35.9; 428/36.9

(58) Field of Classification Search
USPC .................... 428/34.1, 34.2, 35.7, 35.9, 36.9
See application file for complete search history.

(56) References Cited

U.S. PATENT DOCUMENTS

| | | | | | |
|---|---|---|---|---|---|
| 4,464,328 | A | * | 8/1984 | Yoshino et al. | 264/521 |
| 4,629,598 | A | * | 12/1986 | Thompson | 264/537 |
| 4,701,121 | A | * | 10/1987 | Jakobsen et al. | 425/526 |
| 5,191,987 | A | * | 3/1993 | Niimi et al. | 215/379 |
| 5,419,866 | A | * | 5/1995 | Valyi | 264/521 |
| 5,501,590 | A | | 3/1996 | Orimoto et al. | |
| 5,599,496 | A | * | 2/1997 | Krishnakumar et al. | 264/532 |

(Continued)

FOREIGN PATENT DOCUMENTS

CN    1139903 A    1/1997
EP    0 860 265 A1    8/1998

(Continued)

*Primary Examiner* — Marc Patterson
(74) *Attorney, Agent, or Firm* — Sughrue Mion, PLLC (57) ABSTRACT

A process for producing a heat- and pressure-resistant polyester bottle, comprising a primary blow-molding step of obtaining a primary molded article by biaxially stretch-blow-molding a preform of a polyester resin, a heat-treating step of obtaining a secondary molded article that is heat-shrunk by heat-treating the primary molded article, and a secondary blow-molding step of obtaining a finally molded article by biaxially stretch-blow-molding the secondary molded article, wherein the primary blow-molding step biaxially stretches the neck portion of the primary molded article to a size nearly the same as the neck portion of the finally molded article, and the heat-treating step does not cause the neck portion of the secondary molded article to be heat-shrunk. The heat- and pressure-resistant polyester bottle has a slender neck portion of the shape of a so-called crane neck and is suited for containing beer without eradicating the impression of the traditional glass-bottled beer, wherein the length of the neck portion is in a range of 10 to 40% of the height of the bottle, the crystallinity of the neck portion is in a range of 20 to 35%, and the crystallinity of the body portion is in a range of 35 to 50%.

8 Claims, 4 Drawing Sheets

(56) References Cited

U.S. PATENT DOCUMENTS

| | | | |
|---|---|---|---|
| 5,607,517 A * | 3/1997 | Robichon | 134/22.19 |
| 5,735,420 A * | 4/1998 | Nakamaki et al. | 215/373 |
| 5,785,921 A | 7/1998 | Outreman et al. | |
| 5,906,286 A | 5/1999 | Matsuno et al. | |
| 6,012,597 A * | 1/2000 | Nishihara et al. | 215/398 |
| 6,089,854 A | 7/2000 | Outreman et al. | |
| 6,090,334 A | 7/2000 | Matsuno et al. | |
| 6,159,416 A * | 12/2000 | Kawakami et al. | 264/531 |
| 6,436,497 B1 * | 8/2002 | Takahashi et al. | 428/35.7 |
| 6,572,812 B2 * | 6/2003 | Collette et al. | 264/513 |
| 6,939,498 B2 * | 9/2005 | Wong | 264/239 |
| 2002/0081401 A1 * | 6/2002 | Hessok et al. | 428/34.1 |
| 2002/0150703 A1 | 10/2002 | Collette et al. | |

FOREIGN PATENT DOCUMENTS

| | | |
|---|---|---|
| EP | 1 495 853 A1 | 1/2005 |
| GB | 1341848 | 12/1973 |
| JP | 05-200839 A | 8/1993 |
| JP | 8-267549 A | 10/1996 |
| JP | 09-118322 A | 5/1997 |
| JP | 09-290457 A | 11/1997 |
| JP | 2000-000876 A | 1/2000 |
| JP | 2004-330715 A | 11/2004 |
| KR | 2001-0065787 A | 11/2001 |

* cited by examiner

HEAT- AND PRESSURE-RESISTANT POLYESTER BOTTLE AND PROCESS FOR PRODUCING THE SAME

CROSS REFREENCE TO RELATED APPLICATION

This application is a National Stage of International Application No. PCT/JP2007/063196, filed Jun. 26, 2007, the contents of which are incorporated herein by reference in their entirety.

TECHNICAL FIELD

This invention relates to a heat- and pressure-resistant polyester bottle and a process for producing the same. More specifically, the invention relates to a heat- and pressure-resistant polyester bottle of the shape of a so-called crane neck of which a ratio of the neck portion to the overall height of the bottle is larger than that of the conventional polyester bottles, and to a process for producing the same.

BACKGROUND ART

Biaxially stretch-blow-molded containers of a thermoplastic polyester such as polyethylene terephthalate (PET) have excellent transparence, surface luster as well as shock resistance, rigidity and gas-barrier property necessary for the bottles, and have been widely used as bottles for containing various kinds of liquids.

In producing bottled products, in general, the contents are hot-filled, or the contents are filled and are, thereafter, heat-sterilized or pasteurized to improve the preservability of the contents. However, the polyester bottles have a defect of poor heat resistance undergoing thermal deformation and volume-contracting deformation at the time when the contents are hot-filled. Therefore, it is a practice to further heat-set the biaxially stretch-blow-molded containers.

In the use (heat- and pressure-resistant bottle) in which a content that spontaneously produces pressure is heat-sterilized or pasteurized after it has been filled and sealed, however, pressure and heat act simultaneously onto the bottom portion of the bottle causing the bottle portion to be swollen due to the heat-creeping phenomenon. Therefore, attempts have been made to more increase the thickness of the bottom portion than that of the ordinary pressure-resistant bottles so as to impart heat resistance thereto over the limited area, which, however, is not still sufficient making it difficult to attain the effort for reducing the weight and decreasing the thickness.

From the above points of view, there have been proposed a heat- and pressure-resistant polyester bottle and a process for producing the same. For example, JP-A-8-267549 and JP-A-9-118322 filed by the present applicant are proposing heat- and pressure-resistant polyester bottles produced by a 2-stage blow-molding method and processes for producing the same. According to these processes, there can be provided polyester bottles having excellent resistance against the heat and pressure free of the above-mentioned problems even by effecting the heat-sterilization or pasteurization.

Since it has been made possible to provide the polyester bottles having excellent resistance against the heat and pressure, it is now desired to use the polyester bottles for containing beverages that spontaneously produce pressure and that must be heat-sterilized or pasteurized after filled like beer and the like.

That is, though beer has heretofore been traditionally contained in a glass bottle or a can, it has now been desired to contain beer in a biaxially stretch-blow-molded bottle of polyester which is light in weight having excellent shock resistance, as one form of container for packing beer.

When it comes to beer, on the other hand, a general and familiar container of beer is a glass bottle having a neck portion of a slender shape, i.e., having the shape a so-called crane neck of which the diameter in cross section is smaller than that of the body portion but which is long. It is, therefore, desired that the polyester bottle, too, has the shape of the so-called crane neck with a long neck portion as it is the familiar shape of beer bottles.

DISCLOSURE OF THE INVENTION

However, the heat- and pressure-resistant polyester bottles produced by the conventional two-stage blow-molding method are generally such that the mouth portion of the preform is heat-crystallized having a shape that is continuous from the mouth portion to the shoulder portion via a short neck portion and is further continuous to the body portion and to the bottom portion. There has not been known a polyester bottle of a shape that suggests the beer bottle.

That is, though the degree may differ depending upon the relative humidity and the crystallinity of the polyester resin, the polyester resin is, generally, hygroscopic and tends to be creep-deformed with an increase in the coefficient of moisture absorption. If the bottle that has excessively absorbed moisture is filled with the liquid content, the volume of the bottle expands due to the heat and pressure. In the bottle of the shape of a crane neck in which the neck portion has a small diameter in cross section and is slender, in particular, a drop in the liquid level of the liquid content becomes conspicuous in the neck portion which may lead to such a misunderstanding that the amount that is contained is in short. So far, therefore, the polyester bottle was produced inevitably having a shape that was continuous from the mouth portion to the shoulder portion via a short neck portion and was further continuous to the body portion and to the bottom portion as described above.

It is, therefore, an object of the present invention to provide a heat- and pressure-resistant polyester bottle having the shape of a so-called crane neck suited for containing beer without eradicating the impression of the traditional glass-bottled beer and a process for producing the same.

Another object of the present invention is to provide a heat- and pressure-resistant polyester bottle effectively preventing the absorption of moisture by the polyester resin and without arousing the above-mentioned problems despite of its shape of a slender crane neck having a small diameter in cross section and a process for producing the same.

According to the present invention, there is provided a heat- and pressure-resistant polyester bottle including a mouth portion, a neck portion, a shoulder portion, a body portion and a bottom portion obtained by biaxially stretch-molding a preform of a polyester resin, wherein the length of the neck portion is in a range of 10 to 40% of the height of the bottle excluding the mouth portion, the crystallinity of the neck portion is in a range of 20 to 35%, and the crystallinity of the body portion is in a range of 35 to 50%.

In the heat- and pressure-resistant polyester bottle of the present invention, it is desired that:
1. A coefficient of moisture absorption of the body portion after preserved under the conditions of a temperature of 30° C. and a humidity of 80% RH for 7 days is not more than 3000 ppm; and 2. A change of volume after filled with a carbonated solution adjusted to gas volume (GV) of 3.3 and, thereafter, sterilized under the conditions of 65° C. for 30 minutes, is not more than 4.0%.

According to the present invention, there is, further, provided a process for producing a heat- and pressure-resistant polyester bottle, comprising a primary blow-molding step of obtaining a primary molded article by biaxially stretch-blow-molding a preform of a polyester resin, a heat-treating step of obtaining a secondary molded article that is heat-shrunk by heat-treating the primary molded article, and a secondary blow-molding step of obtaining a finally molded article by biaxially stretch-blow-molding the secondary molded article, wherein the primary blow-molding step biaxially stretches the neck portion of the primary molded article to a size nearly the same as the neck portion of the finally molded article, and the heat-treating step does not cause the neck portion of the secondary molded article to be heat-shrunk.

In the process for producing a heat- and pressure-resistant polyester bottle of the present invention, it is desired that:

1. The amount of work represented by a volume ratio of the finally molded article in the secondary blow-molding step is 20 to 40 vol %;
2. A metal mold temperature of the neck portion in the primary blow-molding step is in a range of 15 to 60° C. while a metal mold temperature corresponding to other portions is in a range of 60 to 150° C.;
3. A heating temperature at the body portion in the heat-treating step is in a range of 120 to 210° C.; and
4. A metal mold temperature in the secondary blow-molding step is in a range of 15 to 60° C.

In the heat- and pressure-resistant polyester bottle of the present invention, a first important feature resides in that the length L of the neck portion is in a range of 10 to 40% of the height H of the bottle excluding the mouth portion.

Figure 1:
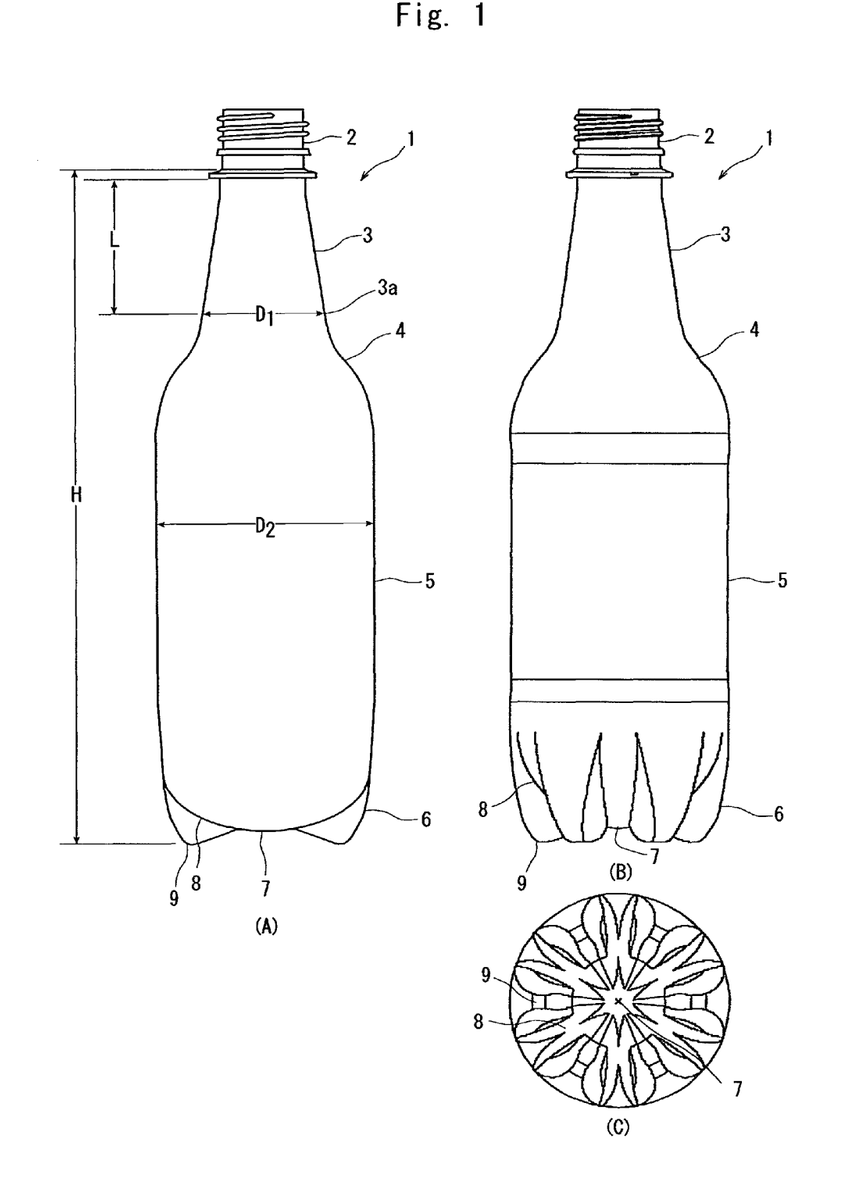
FIG. 1 is a view illustrating a heat- and pressure-resistant polyester bottle of the present invention, wherein (A) is a side sectional view (excluding the mouth portion), (B) is a side view, and (C) is a bottom view.

FIG. 1 is a side sectional view illustrating a heat- and pressure-resistant polyester bottle of the present invention, wherein, generally speaking, the heat- and pressure-resistant polyester bottle of the invention generally designated at 1 includes a mouth portion 2, a neck portion 3 of the shape of a crane neck, a shoulder portion 4 continuous to the neck portion 3 and to a body portion 5, the body portion 5 and a bottom portion 6.

The neck portion 3 has a length L that lies in a range of 10 to 40% and, particularly, 15 to 30% of the height H of the bottle 1 excluding the mouth portion, and is forming such a tapered surface that the outer diameter increases downward.

Further, a root portion 3a between the neck portion 3 and the shoulder portion 4 has an inner diameter D1 that is larger than an inner diameter of the mouth portion and that lies in a range of 30 to 80% and, particularly, 45 to 70% of an inner diameter D2 of the body portion, and is forming a slender neck portion of the shape of a crane neck. When filled with beer which is the content, the neck portion of the shape of a crane neck gives the consumers the same impression as that of beer filled in a glass bottle that has long been familiarized. Though the drawing shows the neck portion in a linearly tapered shape, the neck portion may be slightly changed for it shape, such as being mildly curved, being provided with shallow beads, etc.

The bottom portion 6 as a whole is thinly formed and assumes a so-called petaloidal bottom shape including a plurality of valley portions 8 passing through the bottom center portion 7 and a plurality of foot portions (preferably 5 to 6 foot portions) to impart self-erecting performance and pressure resistance to the bottle 1.

In the heat- and pressure-resistant polyester bottle of the present invention, a second important feature resides in that the crystallinity based on the densitometry is in a range of 20 to 35% in the neck portion and is in a range of 35 to 50% in the body portion.

The heat- and pressure-resistant polyester bottle of the invention is forming a slender neck portion of the shape of a crane neck similar to the shape of a conventional glass bottle for beer. As will be described later, the neck portion, too, has been stretched through the primary blow-molding step. Therefore, the whole bottle inclusive of the neck portion has a crystallinity of not less than 20%, has excellent heat resistance, and has an increased strength upon increasing the crystallinity of the body portion which most affects the volume expansion; i.e., the bottle expands little.

Further, the heat- and pressure-resistant polyester bottle of the invention has a feature in that the body portion after preserved under the conditions of a temperature of 30° C. and a humidity of 80% RH for 7 days exhibits a coefficient of moisture absorption of not more than 3000 ppm.

That is, as described above, moisture-absorbing property of the polyester resin varies depending upon the crystallinity thereof. According to the present invention, however, even the smallest crystallinity in the neck portion is not lower than 20% and the crystallinity is not lower than 35% in the body portion having the largest area that comes in contact with the liquid content. Therefore, the coefficient of moisture absorption is maintained to be not more than 3000 ppm, and creep-deformation is suppressed. Therefore, even the neck portion of the shape of the so-called crane neck is capable of decreasing a change in the liquid level (filling line) of the liquid content in the bottle. Therefore, the position of the filling line can be stably maintained even in a state where there are bottles that are filled in different periods from when they were molded and have different coefficients of moisture absorption.

Further, the heat- and pressure-resistant polyester bottle of the invention has a feature in that a change of volume after filled with a carbonated solution adjusted to 3.3 GV and, thereafter, sterilized under the conditions of 65° C. for 30 minutes, is not more than 4.0%.

The process for producing a heat- and pressure-resistant polyester bottle of the invention is a two-stage blow-molding method, comprising a primary blow-molding step of obtaining a primary molded article by biaxially stretch-blow-molding a preform of a polyester resin, a heat-treating step of obtaining a secondary molded article that is heat-shrunk by heat-treating the primary molded article, and a secondary blow-molding step of obtaining a finally molded article by biaxially stretch-blow-molding the secondary molded article, wherein the first important feature resides in that the primary blow-molding step biaxially stretches the neck portion of the primary molded article to a size nearly the same as the neck portion of the finally molded article, and the heat-treating step does not cause the neck portion of the secondary molded article to be heat-shrunk, and the second important feature resides in that the amount of work represented by a volume ratio of the finally molded article in the secondary blow-molding step is 20 to 40 vol %. Here, the amount of work is represented by the following formula, Amount of work=(volume of the finally molded article−volume of the secondary molded article)/volume of the finally molded article×100

Figure 2:
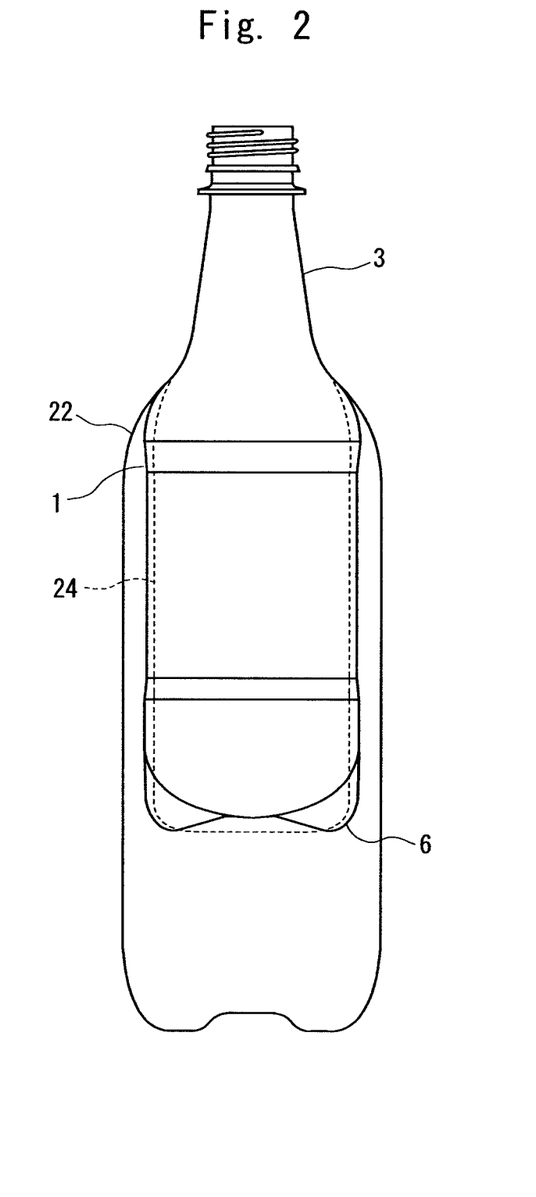
FIG. 2 is a view illustrating the shapes and sizes of intermediate products obtained in the steps in a process for producing the heat- and pressure-resistant polyester bottle of the present invention.

FIG. 2 is a view illustrating the shapes and sizes of the primary molded article, secondary molded article and finally molded article obtained through the steps in the method of producing the heat- and pressure-resistant polyester bottle of the present invention. As will be obvious from FIG. 2, the neck portion 3 of the finally molded article 1 has the shape and the size that are nearly the same as those of the primary molded article 22 obtained through the primary blow-molding step and of the secondary molded article 24 obtained through the heat-treating step. The secondary molded article 24 is shrunk to be smaller than the primary molded article 22, and has the bottom portion of a shape nearly the same as the shape of the bottom portion 6 of the finally molded article 1.

The slender neck portion of the shape of a crane neck can be biaxially stretched with difficulty. If the bottle inclusive of the neck portion is heat-treated, therefore, the shrinking occurs unevenly, and the secondary molded article tends to lean. As a result, the body portion and the bottom portion, too, are unevenly heat-shrunk impairing the insertion into the metal mold for secondary blow and closure of the metal mold. According to the process for producing the heat- and pressure-resistant polyester bottle of the present invention, the slender neck portion of the shape of a crane neck is formed through the primary blow-molding step only without through the heat-shrinking or the secondary blowing. This does not cause a problem in regard to setting and fixing the secondary molded article after heat-shrunk to the metal mold for secondary blow and does not cause a decrease in the productivity, either.

In order to particularly improve the pressure resistance according to the present invention, further, the amount of work in the secondary blow-molding step is not smaller than 20 vol %, which is larger than that of the polyester bottles produced by the general two-stage blowing method. Thus, distortion due to the working is retained to impart elasticity to the finally molded article in order to improve the pressure resistance.

In the heat- and pressure-resistant polyester bottle obtained by the two-stage blowing method, in general, the heat resistance is improved by decreasing the residual distortion in the finally molded article in order to cope with the heat-shrinking at the time of hot filling or at the time of heat-sterilization treatment after filled. From this point of view, the secondary molded article after the heat treatment is brought as close to the shape of the finally molded article as possible to decrease the amount of work in the secondary blow-molding step.

In the heat- and pressure-resistant polyester bottle of the present invention, on the other hand, in order to cope with the phenomenon in which a force acts in the expanding direction due to the internal pressure at the time of heat-sterilization treatment after filled, which is quite different from the use for resisting against the heat, the amount of work in the secondary blow-molding step is set to be greater than that of the general heat-resistant polyester bottles obtained by the above two-stage blow-molding method in order to impart a relatively large distortion to the bottle that is obtained, enabling the bottle to be elastic upon heating, thus making it possible to increase the strength against the pressure.

BEST MODE FOR CARRYING OUT THE INVENTION (Preform)

As a thermoplastic polyester used for the heat- and pressure-resistant polyester bottle of the invention, there can be particularly preferably used an ethylene terephthalate-type thermoplastic polyester.

In the ethylene terephthalate-type thermoplastic polyester preferably used in the invention, the ethylene terephthalate units occupy most and, usually, not less than 70 mol % and, particularly, not less than 80 mol % of the ester recurring units, a glass transition point (Tg) is 50 to 90° C. and, particularly, 55 to 80° C., and a melting point (Tm) is 200 to 275° C. and, particularly, 220 to 270° C.

Though a homopolyethylene terephthalate is preferred from the standpoint of resistance against the heat and pressure, it is also allowable to use a copolymerized polyester containing a small amount of ester units other than the ethylene terephthalate units.

As the dibasic acid other than the terephthalic acid, there can be exemplified aromatic dicarboxylic acids such as isophthalic acid, phthalic acid and naphthalenedicarboxylic acid; alicyclic dicarboxylic acids such as cyclohexanedicarboxylic acid, etc.; aliphatic dicarboxylic acids such as succinic acid, adipic acid, sebacic acid, and dodecanedioic acid, which can be used in one kind or in two or more kinds in combination. As the diol component other than the ethylene glycol, there can be used one or two or more kinds of propylene glycol, 1,4-butanediol, diethylene glycol, 1, 6-hexylene glycol, cyclohexane dimethanol and ethylene oxide adduct of bisphenol A.

The ethylene terephthalate-type thermoplastic polyester that is used should have a molecular weight which is at least large enough for forming a film, and the one of the injection grade or the extrusion grade is used depending upon the use. It is desired that the intrinsic viscosity (I.V.) thereof is, usually, in a range of 0.6 to 1.4 dL/g and, particularly, 0.63 to 1.3 dL/g.

In addition to the single-layer bottle made from the preform of the above polyester resin single-layer constitution, the heat- and pressure-resistant polyester bottle of the invention may be made from a preform of a multilayer constitution in combination with other thermoplastic resins.

As the thermoplastic resin other than the above polyester resin, there can be used any resin if it can be stretch-blow-molded and heat-crystallized. Though not limited thereto only, there can be used olefin resins such as polyethylene, polypropylene, ethylene/propylene copolymer, ethylene/vinyl alcohol copolymer and cyclic olefin polymer; and polyamide resins such as xylylene group-containing polyamide, etc. It is further allowable to use an oxygen-absorbing gas-barrier resin composition obtained by blending the xylylene group-containing polyamide with a diene compound or a transition metal catalyst, a recycled polyester [PCR (resin regenerated from the used bottles), SCR (resin generated in the production plant) or a mixture thereof].

Figure 3:
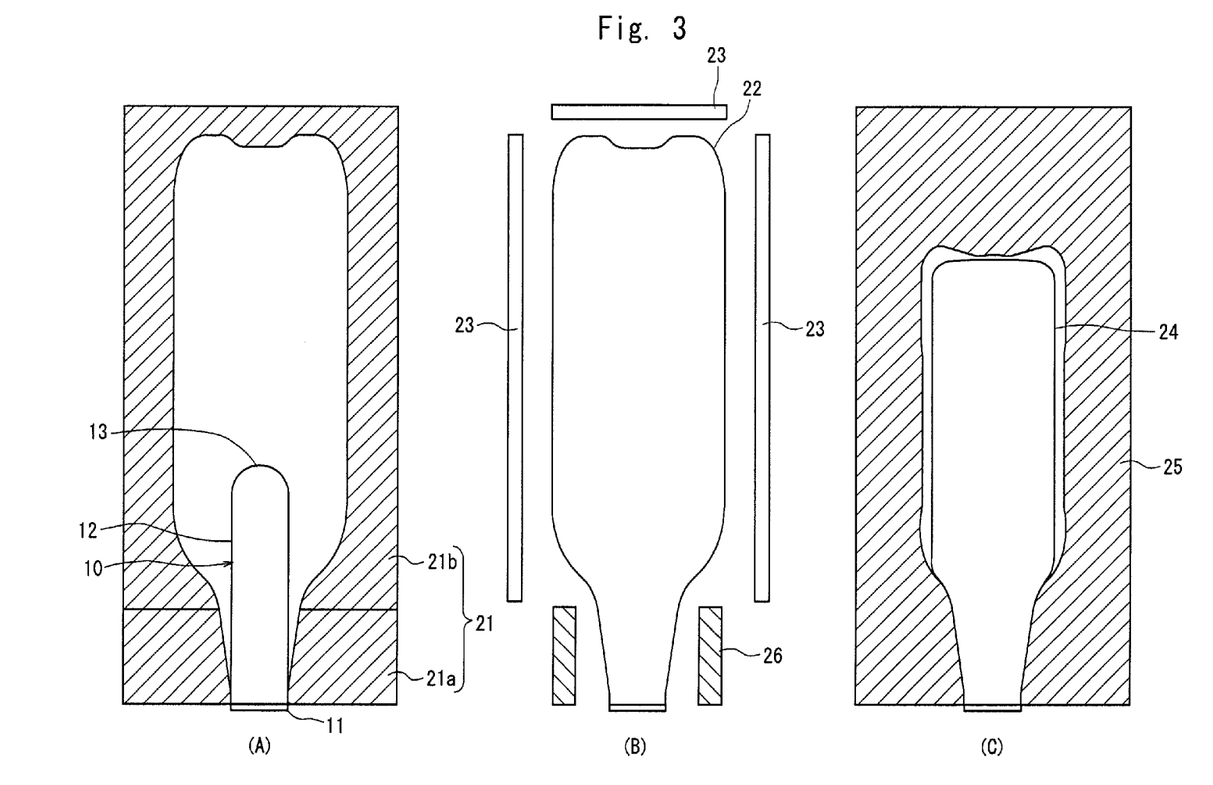
FIG. 3 is a view illustrating the steps of producing the heat- and pressure-resistant polyester bottle of the present invention.

A preform 10 used in the present invention, as shown in FIG. 3(A), includes a mouth portion 11, a body portion 12 and a closed bottom portion 13. Though not closely shown in FIG. 3, the mouth portion 11 is provided with a lid-fastening mechanism such as an annular protrusion or a screw that meets the structure of the lid that is used, such as a cap or a crown. The mouth portion 11 becomes the container mouth portion 2 in FIG. 1, and the upper part of the body portion 12 of the preform becomes the neck portion of the finally molded article, and the intermediate portion and the lower portion become the body portion.

The polyester resin can be molded into the preform by a conventional method such as injection molding or compression molding.

It is desired that the mouth portion 11 of the preform 10 is heat-crystallized; i.e., these portions are selectively heated by a known means. The polyester or the like is heat-crystallized to a conspicuous degree at a specific crystallization temperature. Generally, therefore, the corresponding portion of the preform may be heated at the crystallization temperature. The heating is accomplished by infrared-ray heating or induction heating. Usually, the body portion to be stretched is selectively heated by being insulated from the heat source by using a heat-insulating material.

The heat crystallization may be effected simultaneously with, or separately from, the preheating to the stretching temperature of the preform 10. The mouth portion can be heat-crystallized by heating the mouth portion of the preform at a temperature of, generally, 140 to 220° C. and, particularly, 160 to 210° C. in a state of being thermally insulated from other portions. The mouth portion of the preform desirably has a crystallinity of not smaller than 25%.

Here, the mouth portion does not necessarily have to be heat-crystallized if the sterilization-treating conditions after the content has been filled are nearly comparable to, or milder than, those of Examples appearing later.

(Two-Stage Blow-Molding Method)

The heat- and pressure-resistant polyester bottle of the present invention can be molded by a two-stage blow-molding method. In the two-stage blow-molding method, the preform that was, first, heated to a stretching temperature is primarily blow-molded to form a primary molded article having a bottom portion of the shape of roughly a dome. Next, the shoulder portion, body portion and bottom portion of the primary molded article excluding the mouth portion and the neck portion, are heat-shrunk to obtain a secondary molded article. The secondary molded article which is in a heated state is, further, secondarily blow-molded to obtain a finally molded article.

Referring to FIG. 3 illustrating the two-stage blow-molding method, the preform 10 which, as required, is partly heat-crystallized is preheated by using a heating mechanism. The preform 10 that is preheated is biaxially stretch-blow-molded in a primary blow metal mold 21 to form the bottom portion of the shape of roughly a dome while the portions of the preform other than the heat-crystallized portions are highly stretched to obtain a primary molded article 22. At this moment, the neck portion of the shape of a crane neck is stretched into a shape nearly the same as the shape of the finally molded article (FIG. 3(A)). A difference of about ±5% is permitted for the neck portion of the finally molded article by taking into consideration the shrinking at the time of take out from the primary blow metal mold or the insertion into the secondary blow metal mold.

Next, the portions of the primary molded article 22 excluding the mouth portion and the neck portion, are heated by a heating mechanism 23 to obtain a secondary molded article 24 having the bottom portion and the body portion that are shrunk (FIG. 3(B)). Next, the secondary molded article 24 is blow-molded in the secondary blow metal mold 25 to obtain a finally molded article 1 comprising a plurality of valley portions and foot portions and having a bottom portion which is highly stretched to possess a reduced thickness except the central portion of the bottom (FIG. 3(C)).

The preform is stretched, usually, at a temperature of 85 to 135° C. and, particularly 90 to 130° C. being heated by a known means such as infrared ray heating, hot-air heating furnace or induction heating. The preform that is molded can be, further, stretch-blow-molded by utilizing the heat given to the preform that is to be molded, i.e., by utilizing the remaining heat. Usually, however, it is desired to once mold the preform in a cooled state, and heat the preform at the above stretching temperature to stretch-blow-mold the preform (cold parison method).

[Primary Blow-Molding Step]

In the present invention, it is important in the primary blow-molding step to stretch the neck portion into the shape of a crane neck which is the shape of the neck portion of the finally molded article. To do so, the temperature of a metal mold 21a of the portion corresponding to the neck portion shown in FIG. 3(A) is desirably set to lie in a range of 15 to 60° C. and, particularly, 15 to 40° C. Further, the temperature of a metal mold 21b corresponding to the portions excluding the neck portion is desirably set to be 60 to 150° C. This makes it possible to suppress the shape of the neck portion from being deformed in the subsequent heat-treating step and the secondary blow-molding step.

In the primary blow-molding step, a stretching rod is inserted in the preform, an end thereof is pushed onto the central portion of the bottom portion of the preform to tension-stretch the preform in the axial direction. At the same time, a fluid is blown into the preform to inflation-stretch the preform in the circumferential direction. In this case, a pressing rod may be arranged on the side of the bottom portion in concentric with the stretching rod to hold the central portion of the bottom of the preform by the stretching rod and the pressing rod at the time of tension-stretching so that the central portion of the bottom of the preform is positioned at the center of the primary molded article that is molded.

The bottom portion of the metal mold has the shape of roughly a dome of a large radius of curvature to accelerate the high stretching of the bottom portion of the primary molded article. Here, as shown in FIG. 3, a flat portion is desirably formed at the center of the bottom portion. Desirably, the diameter of the bottom portion of the primary molded article is about 1.1 to about 1.5 times as great as the diameter of the body portion and bottom portion of the final container.

According to the invention, further, the bottom portion of the obtained primary molded article, excluding the bottom central portion, is relatively highly stretched, oriented and crystallized so as to possess a crystallinity of not less than 20% and, more preferably, not less than 24%, and has a thickness that is decreased down to not larger than 1 mm and, more preferably, not larger than 0.8 mm.

It is desired that the stretching ratio in the primary blow-molding step is 2 to 5 times and, particularly, 2.2 to 4 times as great in the axial direction, and 2.5 to 6.6 times and, particularly, 3 to 6 times as great in the circumferential direction. As the pressurized fluid, there can be used the room-temperature air or the heated air, or any other gas such as nitrogen, carbonic acid gas or steam having a pressure of, usually, in a range of 10 to 40 kg/cm² gauge and, particularly, 15 to 30 kg/cm² gauge.

[Heat-Treating Step]

In the heat-treating step, the primary molded article is so positioned that the portions excluding the neck portion face the infrared ray heating body, whereby the portions excluding the neck portion are heated by infrared rays from the infrared ray heating body and shrink in the direction of height and in the radial direction to turn into a secondary molded article having a shape that can be held in the secondary blow metal mold which is of the shape of the finally molded article. In order to more reliably prevent the neck portion from being heat-shrunk, a shielding plate 26 is installed as shown in FIG. 3(B).

Here, in the present invention as described above, it is important that the primary molded article is more heat-shrunk than the amount of shrinking in the conventional two-stage blow-molding method, and it is desired that the primary molded article is so heat-shrunk that the amount of work represented by the volume ratio of the finally molded article is in a range of 20 to 40 vol %. This makes it possible to further improve the pressure resistance. If the amount of work exceeds the above range, the molding tends to become defective developing whitening or rupture due to excess of stretching.

It is desired that the shape of the bottom portion of the secondary molded article is brought as close to the bottom valley portions of the secondary blow metal mold as possible to facilitate the formation of foot portions of the finally molded article. In this case, the shape of the bottom of the secondary molded article plays an important roll as described already.

It is desired that the heating temperature is 120 to 210° C. in the body portion, and the obtained secondary molded article undergoes the shrinking, is heat set and is crystallized. It is desired that the bottom portion, too, is heated at a temperature equal to that at the body portion. In this case, the bottom portion of the primary molded article is in a relatively highly stretched state and is not almost whitened by heating. The infrared ray radiator is made up of a combination of the spherical surfaces having relatively large surface areas featuring relatively excellent radiation efficiency and being heated at about 400 to about 1000° C.

As the infrared ray heating body, there can be concretely utilized a solid surface such as a metal surface of a carbon steel or a stainless steel, a ceramic surface of alumina, magnesia or zirconia, or a composite material surface of ceramic and carbon, or a gaseous surface obtained by burning a gas. The solid surface of the infrared ray heating body is heated at a predetermined temperature by an electric heater buried therein or relying on a high-frequency induction heating.

[Secondary Blow-molding Step]

In the secondary blow-molding step, the secondary molded article is shaped for its portions excluding the mouth portion into the shape of the finally molded article. That is, the fluid is blown into the secondary molded article to effect the secondary blow molding to obtain the bottom shape of the finally molded article having predetermined valley portions and foot portions (preferably, 5 to 6 feet). Since the elasticity has been increased due to the crystallization by heat treatment, it is desired that the secondary molded article is shaped with a high fluid pressure by using a pressurized fluid of, usually, 15 to 45 kg/cm². The neck portion has already been shaped into the shape of the finally molded article and is not almost stretched.

In the heat- and pressure-resistant polyester bottle of the invention that is shown in the drawings, the bottom portion has the so-called petaloidal shape including predetermined valley portions and foot portions. Not being limited thereto only, however, the bottom portion may employ any shape that has heretofore been employed for the bottoms of the pressure-resistant bottles, such as a so-called champaign shape with the center of the bottom portion thereof being dented inward and the surrounding thereof forming a grounding surface.

In the present invention, the heat-setting does not have to be executed in the secondary blow-molding step, and the temperature of the secondary blow metal mold may be 15 to 60° C.

The thus obtained finally molded article has been highly stretched to possess a decreased thickness and has been heat-set inclusive of the neck portion and the bottom portion thereof, and features excellent resistance against the heat and pressure.

EXAMPLES

Testing Method

[Crystallinity]

The crystallinity was calculated in compliance with the following formula based on the density measured by the density-gradient tube method.

$$\text{Crystallinity} = [\rho_c(\rho-\rho_a)]/[\rho \times (\rho_c - \rho_a)] \times 100$$

wherein, $\rho$: measured density (g/cm³)
$\rho_a$: density of the amorphous region (=1.335 g/cm³)
$\rho_c$: density of the crystalline region (=1.455 g/cm³)

Figure 4:
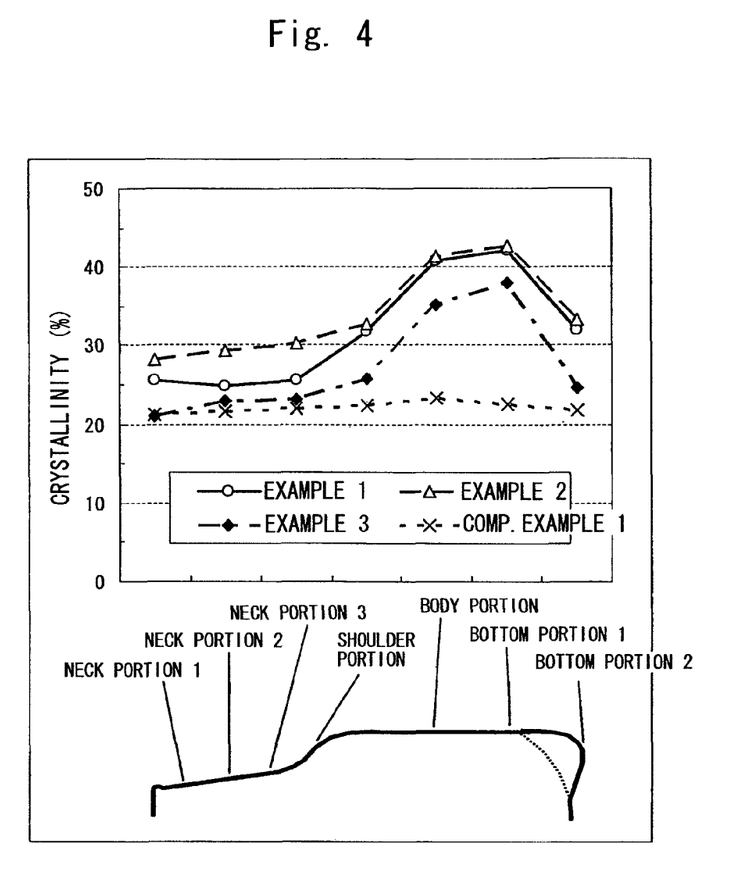
FIG. 4 is a diagram explaining crystallinities at various portions of the polyester bottles prepared in Examples.

The samples to be measured were picked up from various positions of the bottles as shown in FIG. 4.

In Example 3, however, the outer polyethylene terephthalate layer was peeled and measured.

[Filling/Sterilization Treatment]

A bottle was filled with 500 ml of carbonated water adjusted to gas volume (GV) of 3.3 and maintained at 5° C., and was sealed. Next, the bottle was placed in a hot-water shower in a manner that a cold spot was at 65° C. for 24 minutes, and was cooled by a cold-water shower down to room temperature. In Example 3 and Comparative Example 1, the bottles were also evaluated under the conditions of 65° C. for 30 minutes.

Changes in the full-filled content were expressed by the following formula, $$\text{Change in the volume} = (\text{volume after treatment} - \text{volume before filled})/\text{volume after treatment} \times 100$$

A change in the height of a filling line (liquid level of the content) was expressed by a difference between a value immediately after filled and a value after the treatment.

[Moisture Absorption Test]

Bottles after preserved at 30° C. 80% RH for 7 days and bottles after preserved at 40° C. 90% RH for 7 days were filled and sterilization-treated according to the procedure described above.

The coefficient of moisture absorption was calculated by cutting out a sample from the bottle body portion and by calculating a difference in the weight before and after drying.

Example 1

By using an injection-molding machine, a homopolyethylene terephthalate (intrinsic viscosity, 0.78 dL/g) used as the starting material was molded into a preform weighing 33 g and having a mouth portion of a shape that meets a screw cap.

The preform was heated at 110° C. and was primarily blow-molded at a metal mold temperature of neck portion of 25° C. and a metal mold temperature of body portion of 120° C. to obtain a primary molded article having a diameter of 72 mm in the body portion thereof.

The primary molded article was heat-shrunk by being so heated that the temperature at the body portion thereof was 170° C. to obtain a secondary molded article which was immediately subjected to the secondary blow-molding at a metal mold temperature of 25° C. There was molded, as a finally molded article, a bottle having a bottle height excluding the mouth portion of 210 mm, a length of neck portion of 44 mm, a diameter of body portion of 65 mm, a full-filled content of 530 ml, a thickness of body portion of 0.3 mm, and a thickness of bottom portion of 0.8 mm at a position 15 mm away from the center of the bottom portion toward the valley portion. The amount of work was 23%.

Example 2

A bottle of the same shape was molded in the same manner as in Example 1 but setting the diameter of the body portion of the primary molded article to be 76 mm. The amount of work was 19%.

Example 3

A bottle of the same shape was molded in the same manner as in Example 1 but using a copolymerized polyethylene terephthalate (intrinsic viscosity, 0.80 dL/g) containing 1.3 mol % of an isophthalic acid component as inner and outer layers and using, as an intermediate layer, 5% by weight of an oxygen-absorbing resin comprising a polyamide resin as a base material, and molding a multilayer preform by using a co-injection molding machine. The amount of work was 23%.

Comparative Example 1

A bottle having the same appearance as that of Example 1 was molded by injection-molding a preform of a weight of 35 g by using, as the starting material, the same homopolyethylene terephthalate as that of Example 1 and by heating the preform at a temperature of 110° C. and at a metal mold temperature of 120° C. relying on the one-stage blow-molding method. However, the thickness profile of the bottom portion was so adjusted that the thickness of the bottom portion was 2.0 mm at a position 15 mm away from the center of the bottom portion toward the valley portion.

TABLE 1

|  | 30° C. - 80% RH 7 days | | | 40° C. - 90% RH 7 days | | |
| --- | --- | --- | --- | --- | --- | --- |
|  | Change in the volume % | Change in the liquid level mm | Water content ppm | Change in the volume % | Change in the liquid level mm | Water content ppm |
| Ex. 1 | 2.7 | 16.8 | 2840 | 3.2 | 20.0 | 6020 |
| Ex. 2 | 3.2 | 20.0 | 2646 | 3.5 | 20.1 | 5903 |
| Ex. 3 | 2.8 | 19.5 | 2983 | 3.5 | 20.1 | 5961 |
| Comp. Ex. 1 | 5.5 | 25.5 | 3821 | 6.4 | 29.5 | 6021 |

Filling/sterilizing condition: 65° C. - 24 min.

Table 1 shows the results of filling/sterilization treatment under 65° C. for 24 minutes. Under the moisture-absorbing conditions of 30° C. 80% RH 7 days, the coefficients of moisture absorption were smaller than 3000 ppm, changes in the volume were smaller than 3.0% and changes in the liquid level were smaller than 20 mm in all Examples. Even under the conditions of 40° C. 90% RH 7 days in which the moisture was absorbed to near an equilibrium state (about 6000±100 ppm), changes in the volume could be suppressed to be about 3.5%, and changes in the liquid level slightly exceeded 20 mm in Examples 2 and 3.

With the bottles of the shape used for evaluation, the liquid level stayed out of the crane neck portion and descended down to the shoulder portion if a change in the liquid level exceeded 22 mm. In Comparative Example 1, a change in the liquid level exceeded 25 mm even under the conditions of 30° C. 80% RH 7 days, and the bottle was not suited for use as an article of commerce.

TABLE 2

|  | Change in the volume % | Change in the liquid level mm |
| --- | --- | --- |
| Ex. 3 | 3.8 | 20.9 |
| Comp. Ex. 1 | 5.8 | 28.0 |

Filling/sterilizing conditions: 65° C.-30 min.
Moisture-absorbing condition: 30° C.-80% RH 7 days Table 2 shows the results of when the bottles of Example 3 and Comparative Example 1 preserved under 30° C. 80% RH for 7 days were subjected to the filling/sterilization treatment at 65° C. for 30 minutes. Even when subjected to the above severe filling/sterilizing conditions, it was confirmed that the bottle of Example 3 exhibited a change in the volume of not larger than 4.0%, a change in the liquid level of not larger than 21 mm, and possessed a sufficient degree of resistance against the heat and pressure.

The invention claimed is:

1. A heat- and pressure-resistant polyester bottle including a mouth portion, a neck portion, a shoulder portion, a body portion and a bottom portion obtained by biaxially stretch-blow-molding a whole preform of a polyester resin excluding the mouth portion, wherein the length of said neck portion is in a range of 10 to 40% of the height of the bottle excluding the mouth portion, the crystallinity of the neck portion is in a range of 20 to 35%, and the crystallinity of the body portion is in a range of 35 to 50%.

2. The heat- and pressure-resistant polyester bottle according to claim 1, wherein a coefficient of moisture absorption of the body portion after preserved under the conditions of a temperature of 30° C. and a humidity of 80% RH for 7 days is not more than 3000 ppm.

3. The heat- and pressure-rstant polyester bottle according to claim 1, wherein a change of volume after filled with a carbonated solution adjusted to gas volume (GV) of 3.3 and, thereafter, sterilized under the conditions of 65° C. for 30 minutes, is not more than 4.0%.

4. A process for producing the heat- and pressure-resistant polyester bottle as claimed in claim 1, comprising a primary blow-molding step of obtaining a primary molded article by biaxially stretch-blow-molding a whole preform of a polyester resin excluding the mouth portion, a heat-treating step of obtaining a secondary molded article that is heat-shrunk by heat-treating the primary molded article, and a secondary blow-molding step of obtaining a finally molded article by biaxially stretch-blow-molding the secondary molded article, wherein the primary blow-molding step biaxially stretches the neck portion of the primary molded article to a size nearly the same as the neck portion of the finally molded article, and the heat-treating step does not cause the neck portion of the secondary molded article to be heat-shrunk.

5. The process for producing a heat- and pressure-resistant polyester bottle according to claim 4, wherein the amount of work represented by a volume ratio of the finally molded article in the secondary blow-molding step is 20 to 40 vol %.

6. The process for producing a heat- and pressure-resistant polyester bottle according to claim 4, wherein a metal mold temperature of a portion corresponding to the neck portion of the primary molded article in said primary blow-molding step is in a range of 15 to 60° C. while a metal mold temperature corresponding to other portions of the primary molded article is in a range of 60 to 150° C.

7. The process for producing a heat- and pressure-resistant polyester bottle according to claim 4, wherein a heating temperature at the body portion in said heat-treating step is in a range of 120 to 210° C.

8. The process for producing a heat- and pressure-resistant polyester bottle according to claim 4, wherein a metal mold temperature in said secondary blow-molding step is in a range of 15 to 60° C.

* * * * *